(12) United States Patent
Brune

(10) Patent No.: US 7,469,005 B2
(45) Date of Patent: Dec. 23, 2008

(54) METHOD FOR SYNCHRONIZING MEMORY AREAS IN A TRANSMITTER APPARATUS AND A RECEIVER APPARATUS, AND RECEIVER APPARATUS

(75) Inventor: Thomas Brune, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 662 days.

(21) Appl. No.: 11/086,591

(22) Filed: Mar. 22, 2005

(65) Prior Publication Data

US 2005/0213694 A1 Sep. 29, 2005

(30) Foreign Application Priority Data

Mar. 27, 2004 (DE) ........................ 10 2004 015 159

(51) Int. Cl.
*H04B 1/38* (2006.01)
(52) U.S. Cl. ...................................... 375/220; 375/358
(58) Field of Classification Search ................. 375/242, 375/254, 295, 316, 340, 346, 354, 356, 220, 375/219, 222, 358; 370/351, 357, 361, 363, 370/379, 389, 392
See application file for complete search history.

(56) References Cited

U.S. PATENT DOCUMENTS 5,475,681 A * 12/1995 White et al. ................ 370/349

FOREIGN PATENT DOCUMENTS

| EP | 1 249 744 | 10/2002 |
|---|---|---|
| EP | 1246409 | 10/2002 |
| GB | 2350984 | 12/2000 |

OTHER PUBLICATIONS

Search Report EP0377136, Mar. 13, 1996, IBM.

* cited by examiner

*Primary Examiner*—Emmanuel Bayard
(74) *Attorney, Agent, or Firm*—Joseph J. Laks; Robert B. Levy; Jorge Tony Villabon

(57) ABSTRACT

The invention relates to a method for synchronizing a transmitter memory area in a transmitter memory in a transmitter apparatus with a receiver memory area in a receiver memory in a receiver apparatus, and to a receiver apparatus. The transmitter memory area stores transmission data as transmission-data packets and the receiver memory area stores received data as received-data packets with associated error status data which respectively indicate an error status for the received-data packets. Before a reference identification is generated in the receiver apparatus, which, following transmission using a feedback message in the transmitter apparatus, is used for memory area synchronization, the error status data for a plurality of the received-data packets are checked in the receiver apparatus until a first received-data packet is ascertained for which the error status data indicate no error status. An identification which identifies the first received-data packet is used to ascertain an identification for the current reference received-data packet taking into account a predetermined formation rule for forming the identifications for the received-data packets, from which identification the reference identification for the current reference received-data packet is derived.

9 Claims, 2 Drawing Sheets

METHOD FOR SYNCHRONIZING MEMORY AREAS IN A TRANSMITTER APPARATUS AND A RECEIVER APPARATUS, AND RECEIVER APPARATUS

This application claims the benefit, under 35 U.S.C. §119 of German Patent Application 102004015159.8, filed Mar. 27, 2004.

FIELD OF THE INVENTION

The invention relates to a method for synchronizing memory areas in a transmitter apparatus and a receiver apparatus, particularly a transmitter memory area in a transmitter memory in a transmitter apparatus and a receiver memory area in a receiver memory in a receiver apparatus, and to a receiver apparatus.

BACKGROUND OF THE INVENTION

Increasingly, a plurality of electronic appliances are being interconnected using a network, even in the field of home electronics, so that electronic data can be interchanged between the appliances. The electronic data interchange between the electronic appliances then takes place within the network not just via cable connections between the appliances, for example on the basis of IEEE1394 bus systems, but also using wireless connections. There are already various systems which can be used for wirelessly transmitting electronic data between such appliances. In this context, the system "Hiperlan2" may be cited, in particular. The Hiperlan2 system allows appliances to be connected together in a network, for example home electronics appliances.

A basic requirement when operating the network with a plurality of appliances between which electronic data are interchanged is that the electronic data be transmitted between one or more of the connected appliances with as little error as possible. If errors arise when transmitting the data, they need to be recognized and possibly corrected. For this purpose, systems such as "Hiperlan2" provide a mode of operation in which, during data transmission between a transmitter apparatus and a receiver apparatus which are connected to the network together, the detection of an incorrect data packet in the receiver apparatus automatically generates a request for a repeat transmission of the incorrect data packet (ARQ—"Automatic Repeat request") and sends it to the transmitter apparatus. In this way, the transmitter apparatus is informed, in particular, about an error status for each received-data packet received incorrectly in the receiver apparatus. The receiver apparatus generates a feedback message which indicates whether or not a received-data packet received in the receiver apparatus contains an error. The presence or absence of an error is indicated using associated error status data for each received-data packet in the receiver apparatus. The check to determine whether or not there is an error is carried out in the receiver apparatus using an error recognition code (for example CRC—"Cyclic Redundancy Check") which the data packets received by the receiver apparatus contain.

The receiver apparatus has a receiver memory with a receiver memory area which is used to store the received-data packets and the respective associated error status data. The receiver memory area with the received-data packets and the error status data corresponds to a transmitter memory area in a transmitter memory in the transmitter apparatus from which transmission-data packets have been transmitted to the receiver apparatus. To ensure functional operation of the electronic data interchange between the transmitter apparatus and the receiver apparatus, it is necessary for the transmitter memory area and the receiver memory area to be synchronized. This is done using the feedback message described.

When it is being processed in the transmitter apparatus, the feedback message can first of all be used to provide information about the error status of the received-data packets in the receiver memory area, so that the transmitter apparatus can subsequently update the information about the data packets in the transmitter memory area by assigning the transmission-data packets in the transmitter memory area a respective status which corresponds to the status of the associated received-data packet in the receiver memory area.

In order to carry out the synchronization between the receiver memory area and the transmitter memory area correctly, it is also necessary for the feedback message to include an explicit reference identification which ensures correct association of the information from the feedback message between received-data packets in the receiver memory area and transmission-data packets in the transmitter memory area. The reference identification identifies a received-data packet which is used to stipulate the location of the receiver memory area in the receiver memory, for example the first received-data packet in the receiver memory area. Since the reference identification can be used to assign the received-data packet an associated transmission-data packet in the transmitter memory area, this allows the transmitter memory area and the receiver memory area to be stipulated, so that the two memory areas include data packets which can be associated with one another.

In this context, provision can be made for the reference identification to be a bitmap block number (BMN). The bitmap block numbers are derived for single received/transmission-data packets from a sequence number explicitly associated with the respective data packet. However, this procedure has the problem that the reference identification for the feedback message is sometimes derived on the basis of the sequence number of a received-data packet which has itself been transmitted incorrectly between the transmitter apparatus and the receiver apparatus, which prevents correct synchronization of the transmitter memory area and the receiver memory area.

BRIEF DESCRIPTION OF PREFERRED EMBODIMENTS

The invention is based on the object of specifying an improved method for synchronizing a transmitter memory area in a transmitter apparatus with a receiver memory area in a receiver apparatus and a receiver apparatus which prevent incorrect synchronization.

The invention is achieved by a method having the features specified in claim 1 and by a receiver apparatus having the features specified in claim 7.

Advantageous Developments are Presented in the Subclaims.

The invention proposes a method for synchronizing a transmitter memory area in a transmitter memory in a transmitter apparatus with a receiver memory area in a receiver memory in a receiver apparatus, where the transmitter memory area stores transmission data as transmission-data packets and the receiver memory area stores received data as received-data packets with associated error status data which respectively indicate an error status for the received-data packets, and where the method involves:

the receiver apparatus generating a feedback message and transmitting it to the transmitter apparatus, with the feedback message containing a reference identification for a current reference received-data packet which the received-data packets include and which is used to locate the receiver memory area in the receiver memory; and the feedback message being processed in the transmitter apparatus by using the reference identification to identify among the transmission-data packets a reference transmission-data packet which corresponds to the current reference received-data packet and to update a location for the transmitter memory area in the transmitter memory taking into account the reference transmission-data packet;

where, before the reference identification is generated in the receiver apparatus, the error status data from a number of the received-data packets are checked until a first received-data packet is ascertained for which the error status data indicate no error status, and an identification which identifies the first error-free received-data packet is used to ascertain an identification for the current reference received-data packet taking into account a predetermined formation rule for forming the identifications for the received-data packets, from which identification the reference identification for the current reference received-data packet is derived.

In accordance with a further aspect of the invention, a receiver apparatus having the following features is provided:

a receiver memory area which stores received-data packets with respective associated error status data; a checking device for checking error status data for one or all received-data packets in the receiver memory area before generating a reference identification for a feedback message for the purpose of synchronizing the receiver memory area with a transmitter memory area in a transmitter apparatus which (transmitter memory area) comprises transmission-data packets which can be associated with the received-data packets; an ascertainment device for ascertaining an identification for a current reference received-data packet from an identification for a first received-data packet for which it has been found, using the checking device when checking the error status data, that the error status data indicate no error status; and a generation device for deriving the reference identification for the feedback message from the ascertained identification for the current reference received-data packet.

A fundamental advantage which the invention achieves over the prior art is that the method is used to ensure reliable synchronization between the transmitter memory area and the receiver memory area by virtue of the reference identification for the feedback message being imperatively derived from the identification for a received-data packet, which identification is error-free. Using the method, this absence of error is also ensured when, previously, when transmitting the current reference received-data packet, an error has occurred which has resulted in an incorrect identification in the current reference received-data packet. However, ascertaining an error-free identification in a received-data packet which has been transmitted without error and subsequently ascertaining the correct identification for the current reference received-data packet prevents the incorrect identification from being used to derive the reference identification for the feedback message. The incorrect identification is automatically replaced with the correct identification in the method in order to derive the reference identification.

This improves the overall security of the data transmission in a network to which the transmitter apparatus and the receiver apparatus are connected. Transmission errors are prevented from resulting in disadvantageous subsequent errors in the network.

BRIEF DESCRIPTION OF THE DRAWINGS

An exemplary embodiment of the invention is also described with reference to the drawings, in which.

DETAILED DESCRIPTION OF PREFERRED EMBODIMENTS

Figure 1:
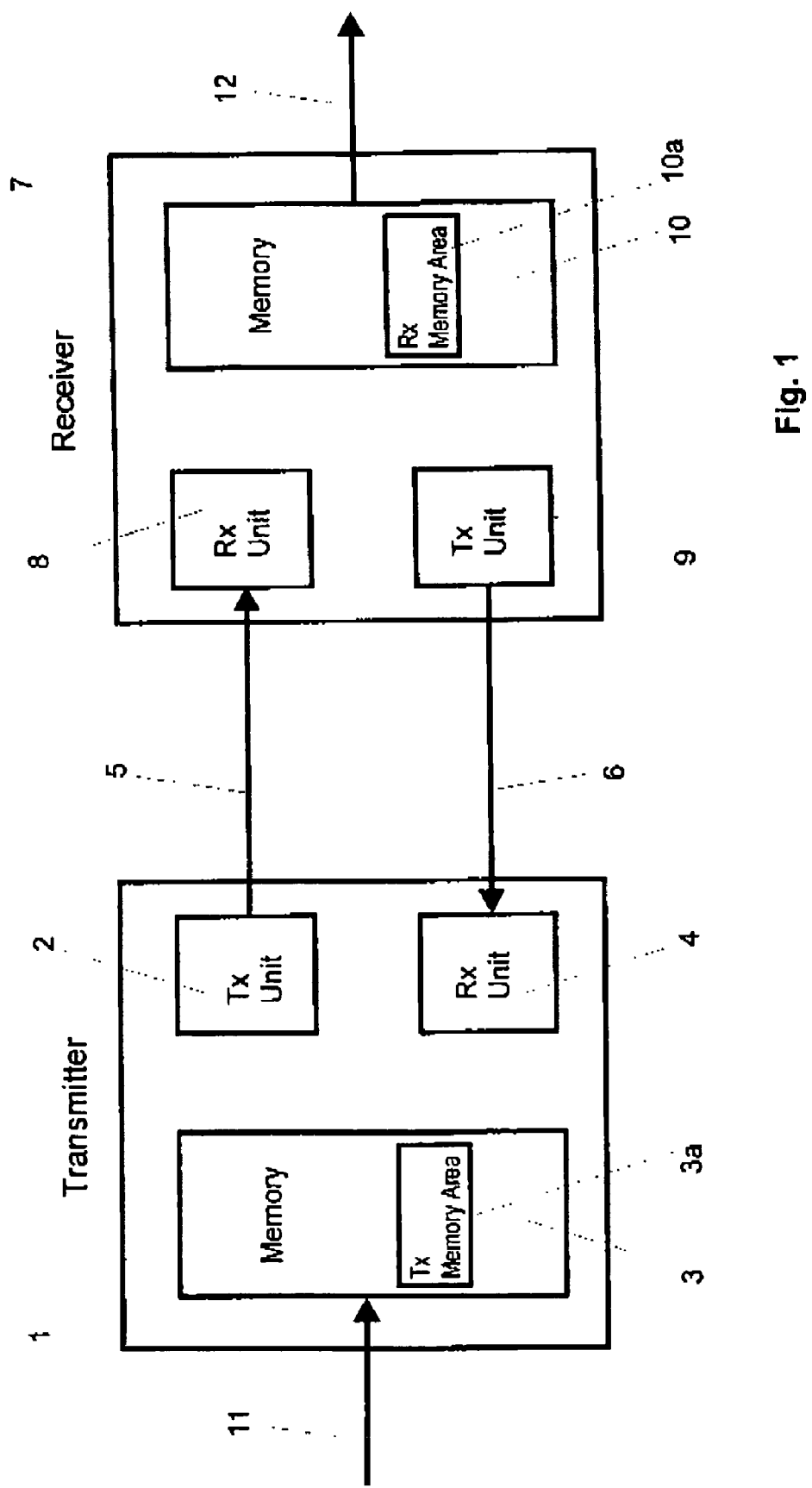
FIG. 1 shows a schematic illustration of an arrangement with a transmitter apparatus and a receiver apparatus.

FIG. 1 shows a schematic illustration of an arrangement with a transmitter apparatus 1 which has a transmission-end transmission unit 2, a transmitter memory 3 and a transmission-end reception unit 4. Data links 5, 6 connect the transmitter apparatus 1 to a receiver apparatus 7 for the purpose of interchanging electronic data, said receiver apparatus 7 having a reception-end reception unit 8, a reception-end transmission unit 9 and a receiver memory 10 formed in it. The transmitter apparatus 1 and the receiver apparatus 7 are in the form of units in a "Hiperlan2" system. Arrows 11, 12 in FIG. 1 schematically indicate the writing of transmission data, in the form of transmission-data packets, to the transmitter memory 3 and an application's access to received-data packets in the receiver memory 10. In line with FIG. 1, the transmitter memory 3 contains a transmitter memory area $3a$ and the receiver memory 10 contains a receiver memory area $10a$.

Figure 2:
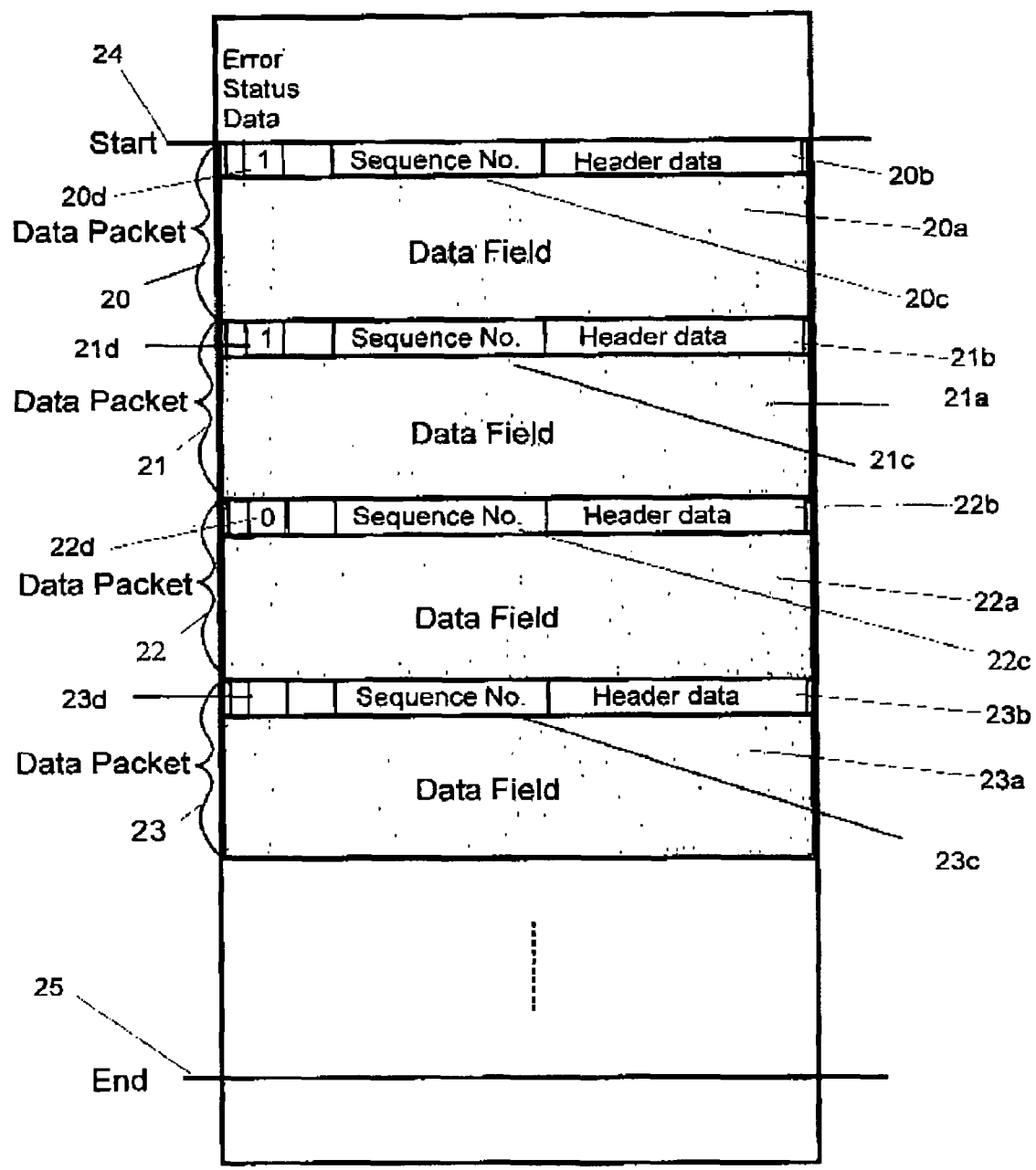
FIG. 2 shows a schematic illustration of a receiver memory area in the receiver apparatus with a plurality of received-data packets.

FIG. 2 shows a schematic illustration of an arrangement of received-data packets 20, 21, 22 and 23 in the receiver memory area $10a$ between a start 24 and an end 25 of the receiver memory area $10a$. The received-data packets 20-23 respectively comprise a data field $20a$, $21a$, $22a$, $23a$ and header data $20b$, $21b$, $22b$, $23b$. The header data $20b$-$23b$ respectively comprise a sequence number $20c$, $21c$, $22c$, $23c$, which identifies the associated received-data packet 20-23 and which is used as an explicit identification in the receiver memory 10 and/or in the receiver memory area $10a$, and also error status data $20d$, $21d$, $22d$, $23d$. The error status data $20d$-$23d$ indicate for the respective received-data packet 20-23 whether an error has been detected during a check on the associated received-data packet after reception in the receiver apparatus 7. This check is performed in the receiver apparatus 7 using an error code which is included in the transmission-data packets transmitted from the transmitter apparatus 1 to the receiver apparatus 7 via the data link 5. The error status is checked before the received-data packets 20-23 are stored in the receiver memory area $10a$ in the receiver memory 10. In line with FIG. 2, the error status data $20d$-$23d$ are formed by a "1" (error present) or by a "0" (no error found) in the exemplary embodiment.

The transmission-data packets transmitted from the transmitter memory area $3a$ using the transmission-end transmission unit 2, the data link 5 and the reception-end reception unit 8 are stored in the receiver memory area $10a$ in the receiver apparatus 7. To synchronize the receiver memory area $10a$ with the transmitter memory area $3a$, the error status data $20d$ for the received-data packet 20 are now checked first of all. By way of example, it is detected in this case that the error status data $20d$ indicate an error for the received-data packet 20. The error status data $21d$ for the next received-data packet 21 in the receiver memory area $10a$ are then checked.

In the example, it is also detected in this case that the error status data 21*d* indicate an error. The error status data 22*d* for the next received-data packet 22 but one are then checked. These error status data 22*d* indicate that the received-data packet 22 has been received and stored without error. On the basis of this check result, the sequence number 20*c* for the received-data packet 20 is then derived from the sequence number 22*c* in the header data 22*b* of the received-data packet 22 by using a predetermined formation rule for the sequence numbers to calculate back in order to infer the correct (that is to say in any case not incorrect) sequence number 20*c*. By way of example, sequence numbers are formed between consecutive data packets by increasing the value by one in each case. The error-free sequence number 22*c* can now be used to derive a reference identification which identifies the received-data packet 20 without error. To this end, the number of received-data packets recognized as being incorrect needs to be deduced from the sequence number of the error-free received-data packet 22 in this case. The reference identification is a bitmap block number (BMN), for example.

The procedure described is used to ensure that the reference identification is ascertained from an error-free sequence number. The reference identification formed in this way is then integrated into a feedback message which is formed in the receiver apparatus 7 and is sent from the receiver-end transmission unit 9 to the transmission-end reception unit 4 via the data link 6.

The way in which the method has been described is that the received-data packets 20-23 in the receiver memory area 10*a* have been examined for the error status data 20*d*-23*d* according to their order, which normally minimizes the time taken for memory access. Alternatively, provision may be made for the error status data 20*d*-22*d* to be examined according to a modified or on the basis of a random order.

This form of the method can also be used to ensure that the reference identification is derived only from a sequence number for which freedom from error is assured.

In the transmitter apparatus 1, the transmission-end reception unit 4 analyses the feedback message and marks the transmission-data packets in the transmitter memory area 3*a* in line with the information contained in the feedback message. In this context, the transmission-data packets are marked as data packets which need to be transmitted again on account of the occurrence of errors and/or data packets for which the transmission status is in order.

Furthermore, the reference identification from the feedback message identifies the first received-data packet 20 (cf. FIG. 2) in the receiver memory area 10*a* clearly and without error, which means that the reference identification is used to stipulate the transmitter memory area 3*a* in the transmitter memory 3 such that the associated transmission-data packet is the first transmission-data packet in the transmitter memory area 3*a*. In this way, the transmitter memory area 3*a* is updated as a whole and is therefore synchronized with the receiver memory area 10*a*. The feedback message is generated automatically (ARQ—"Automatic Repeat reQuest").

The method described can be used not just in connection with "Hiperlan2" systems but rather can be applied generally for system configurations in which memory areas are synchronized using feedback messages. In this context, memory areas to be synchronized relate to areas in the transmitter apparatus and in the receiver apparatus, the area which is present in the receiver apparatus and needs to be synchronized with the area in the transmitter apparatus being defined by virtue of its comprising received-data packets which correspond to associated transmission-data packets from the area in the transmitter apparatus.

What is claimed is:

1. Method for synchronizing a transmitter memory area in a transmitter memory in a transmitter apparatus with a receiver memory area in a receiver memory in a receiver apparatus, where the transmitter memory area stores transmission data as transmission-data packets and the receiver memory area stores received data as received-data packets with associated error status data which respectively indicate an error status for the received-data packets, and where the method involves;

the receiver apparatus generating a feedback message and transmitting it to the transmitter apparatus, with the feedback message containing a reference identification for a current reference received-data packet which the received-data packets include and which is used to locate the receiver memory area in the receiver memory; and the feedback message being processed in the transmitter apparatus by using the reference identification to identify among the transmission-data packets a reference transmission-data packet which corresponds to the current reference received-data packet and to update a location for the transmitter memory area in the transmitter memory taking into account the reference transmission-data packet;

where, before the reference identification is generated in the receiver apparatus, the error status data from a number of the received-data packets are checked until a first received-data packet is ascertained for which the error status data indicate no error status, and an identification which identifies the first error-free received-data packet is used to ascertain an identification for the current reference received-data packet taking into account a predetermined formation rule for forming the identifications for the received-data packets, from which identification the reference identification for the current reference received-data packet is derived.

2. Method according to claim 1, wherein the error status data are respectively generated in the receiver apparatus for the received-data packets taking into account an error recognition code which the transmission-data packets respectively include.

3. Method according to claim 1, wherein the number of received-data packets are checked according to a continuous memory order in the receiver memory area when the error status data are checked, and in that ascertaining the identification for the current reference received-data packet involves calculating back from the identification for the first error-free received-data packet.

4. Method according to claim 1, wherein the reference identification generated is a bitmap block number.

5. Method according to claim 1, wherein the identification for the received-data packets is stored in a respective header data record.

6. Method according to claim 5, wherein the respective error status data are used to indicate whether an error has been ascertained in the header data record and/or in a data field in the associated received-data packet.

7. The receiver apparatus, particularly for use in a method according to claim 1, having:

the receiver memory area which stores the received-data packets with respective associated error status data;

a checking device for checking the error status data for one or all received-data packets in the receiver memory area before generating a reference identification for a feedback message for the purpose of synchronizing the receiver memory area with the transmitter memory area in the transmitter apparatus which (transmitter memory area) comprises the transmission-data packets which can be associated with the received-data packets;

an ascertainment device for ascertaining the identification for the current reference received-data packet from the identification for the first received-data packet for which it has been found, using the checking device when checking the error status data, that the error status data indicate no error status; and a generation device for deriving the reference identification for the feedback message from the ascertained identification for the current reference received-data packet.

8. The receiver apparatus according to claim 7, wherein the checking device is configured to check one or all of the received-data packets for the error status data according to a continuous memory order in the receiver memory area.

9. The receiver apparatus according to claim 7, wherein the generation device is configured to generate a bitmap block number as the reference identification.

* * * * *